(12) United States Patent
Jung et al.

(10) Patent No.: US 12,280,890 B2
(45) Date of Patent: Apr. 22, 2025

(54) AUXILIARY PROPULSION APPARATUS FOR AIR VEHICLE

(71) Applicants: Hyundai Motor Company, Seoul (KR); Kia Corporation, Seoul (KR)

(72) Inventors: Woo Suk Jung, Hwaseong-si (KR); Gwi Taek Kim, Cheonan-si (KR); Yoon Cheol Jeon, Suwon-si (KR); Hyun Ki Cho, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/644,352

(22) Filed: Apr. 24, 2024

(65) Prior Publication Data

US 2024/0270403 A1    Aug. 15, 2024

Related U.S. Application Data

(62) Division of application No. 17/381,741, filed on Jul. 21, 2021, now Pat. No. 11,993,392.

(30) Foreign Application Priority Data

Dec. 24, 2020    (KR) .................. 10-2020-0183448

(51) Int. Cl.
| | |
|---|---|
| *B64D 41/00* | (2006.01) |
| *B64C 15/14* | (2006.01) |
| *B64D 27/24* | (2006.01) |
| *B64D 31/06* | (2006.01) |
| *F16D 48/10* | (2006.01) |
| *F16D 21/00* | (2006.01) |

(52) U.S. Cl.
CPC ............. *B64D 41/00* (2013.01); *B64C 15/14* (2013.01); *B64D 27/24* (2013.01); *B64D 31/06* (2013.01); *F16D 48/10* (2013.01); *F16D 21/00* (2013.01); *F16D 2500/306* (2013.01)

(58) Field of Classification Search
CPC ...... B64D 41/00; B64D 27/026; B64C 15/14; F01D 15/12
USPC ........................................ 60/39.41
See application file for complete search history.

(56) References Cited

U.S. PATENT DOCUMENTS

| | | |
|---|---|---|
| 4,380,897 A | 4/1983 | Zaba |
| 5,779,169 A | 7/1998 | Sloan |
| 7,104,499 B1 | 9/2006 | Arata |
| | (Continued) | |

FOREIGN PATENT DOCUMENTS

| | | |
|---|---|---|
| CA | 2818066 A1 | 12/2013 |
| GB | 2594072 A | 10/2021 |

*Primary Examiner* — Timothy D Collins
*Assistant Examiner* — Terri L Filosi
(74) *Attorney, Agent, or Firm* — Morgan, Lewis & Bockius LLP

(57) ABSTRACT

An auxiliary propulsion apparatus of an air vehicle may include an engine mounted in a fuselage of the air vehicle, a generator configured to be driven using power from the engine, a compressor configured to be driven by the engine or the generator, a battery configured to store electricity generated by the generator, an electricity distributor connected to the generator, the battery and the main propulsion apparatus and configured to distribute electricity generated by the generator to the battery and to a main propulsion apparatus, and at least one nozzle device configured to jet high-pressure gas, supplied from the compressor, to an outside of the fuselage.

5 Claims, 9 Drawing Sheets

(56) References Cited

U.S. PATENT DOCUMENTS

2017/0057621 A1    3/2017   Evulet
2020/0300166 A1    9/2020   Evulet
2022/0033097 A1    2/2022   Botti et al.

AUXILIARY PROPULSION APPARATUS FOR AIR VEHICLE

CROSS-REFERENCE TO RELATED APPLICATION

The present application is a Divisional of U.S. patent application Ser. No. 17/381,741, filed Jul. 21, 2021, which claims priority to Korean Patent Application No. 10-2020-0183448, filed on Dec. 24, 2020, the entire contents of which is incorporated herein for all purposes by this reference.

BACKGROUND OF THE INVENTION

Field of the Invention

The present invention relates to an auxiliary propulsion apparatus, which is applicable to an air vehicle such as an urban air mobility (UAM).
Description of Related Art
When an air vehicle such as an UAM is provided with an auxiliary propulsion apparatus capable of providing the air vehicle with separate or auxiliary thrust force in the event of failure of the air vehicle, it is possible to greatly improve safety. However, there are disadvantages of increasing the weight of the components mounted on the air vehicle and the drag of the fuselage and of decreasing the amount of space for accommodating passengers and the drag of the air vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an auxiliary propulsion apparatus of an air vehicle configured for efficiently and flexibly providing lift force and auxiliary thrust force required for cruising of an air vehicle to improve stability and flight performance of the air vehicle while ensuring increased drag, minimized reduction of space for passengers, and increased range.

In accordance with an aspect of the present invention, the above and other objects may be accomplished by the provision of an auxiliary propulsion apparatus of an air vehicle including an engine mounted in a fuselage of the air vehicle, a generator configured to be driven using power from the engine, a compressor configured to be driven by the engine or the generator, a battery configured to store electricity generated by the generator, an electricity distributor connected to the generator, the battery and the main propulsion apparatus and configured to distribute electricity generated by the generator to the battery and a main propulsion apparatus, and at least one nozzle device configured to jet pressurized gas supplied from the compressor, to an outside of the fuselage.

The auxiliary propulsion apparatus may further include a first clutch, configured to selectively engage transmission of power from the engine to the generator, and a second clutch connected to the first clutch in series to selectively engage transmission of the power from the engine to the compressor via the first clutch.

An output shaft of the engine, the first clutch and the second clutch may be coaxially disposed, and an intermediate shaft may be provided between the first clutch and the second clutch to transmit the power to the generator.

The auxiliary propulsion apparatus may further include a controller electrically connected to the generator and configured to drive the generator using electric power received from the battery to drive the compressor in the state in which the first clutch is disengaged but the second clutch is engaged when the engine fails.

The nozzle device may include a lift-generating nozzle device configured to jet the pressurized gas in a downward direction of the fuselage of the air vehicle, and a thrust-generating nozzle device configured to jet the pressurized gas in the rearward direction of the fuselage of the air vehicle.

The lift-generating nozzle device may include a front nozzle disposed at the front side of the fuselage and a rear nozzle disposed at the rear side of the fuselage.

The front nozzle and the rear nozzle may be symmetrically disposed to face each other, and each thereof may be configured to have a linear shape.

The front nozzle may be connected to the compressor via a front gas pipe, the front gas pipe including a front gas valve for controlling flow rate of the pressurized gas jetted through the front nozzle, and a front tank for temporarily storing the pressurized gas therein may be provided between the front nozzle and the front gas pipe to uniformly jet the pressurized gas through the linear front nozzle.

The rear nozzle may be connected to the compressor via a rear gas pipe, the rear gas pipe including a rear gas valve for controlling the flow rate of the pressurized gas jetted through the rear nozzle, and a rear tank for a predetermined time storing the pressurized gas therein may be provided between the rear nozzle and the rear gas pipe to uniformly jet the pressurized gas from the linear rear nozzle.

The thrust-generating nozzle device may include a thrust nozzle jetting the pressurized gas in the rearward direction of the fuselage to generate cruising thrust force, a thrust gas pipe connecting the thrust nozzle to the compressor, and a thrust gas valve provided at the thrust gas pipe.

In accordance with another aspect of the present invention, there is provided a method of controlling the auxiliary propulsion apparatus of an air vehicle including engaging the second clutch when an abnormal state occurs in the main propulsion apparatus, determining whether or not the engine has failed, disengaging the first clutch and driving the generator using power from the battery to drive the compressor when the engine has failed, and jetting the pressurized gas, supplied from the compressor, through the nozzle device to supplement the thrust force of the air vehicle.

The method may further include engaging the first clutch to drive the compressor using power from the engine when the engine is determined to be normal as a result of the determination as to whether or not the engine has failed.

In accordance with a further aspect of the present invention, there is provided a method of controlling the auxiliary propulsion apparatus of an air vehicle including engaging the second clutch when an abnormal state occurs in the main propulsion apparatus during vertical takeoff or landing of the air vehicle, determining whether or not the engine has failed, disengaging the first clutch and driving the generator using power from the battery to drive the compressor when the engine has failed, and jetting the pressurized gas, supplied from the compressor, through the lift-generating nozzle device to assist takeoff and landing of the air vehicle.

The method may further include engaging the second clutch when there is insufficient thrust force for cruising of the air vehicle, engaging the first clutch to drive the compressor using power from the engine when the engine has not failed, and jetting the pressurized gas, supplied from the compressor, through the thrust-generating nozzle device to supplement the thrust force of the air vehicle.

The method may further include engaging the second clutch when there is a demand for the air vehicle to travel to land after sitting on water, engaging the first clutch to drive the compressor using power from the engine when the engine has not failed or disengaging the first clutch to drive the generator using electric power received from the battery when the engine has failed, and jetting the pressurized gas, supplied from the compressor, through the lift-generating nozzle device to supplement the lifting force of the air vehicle and jetting the pressurized gas, supplied from the compressor, through the thrust-generating nozzle device to supplement the thrust force for traveling of the air vehicle on water.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
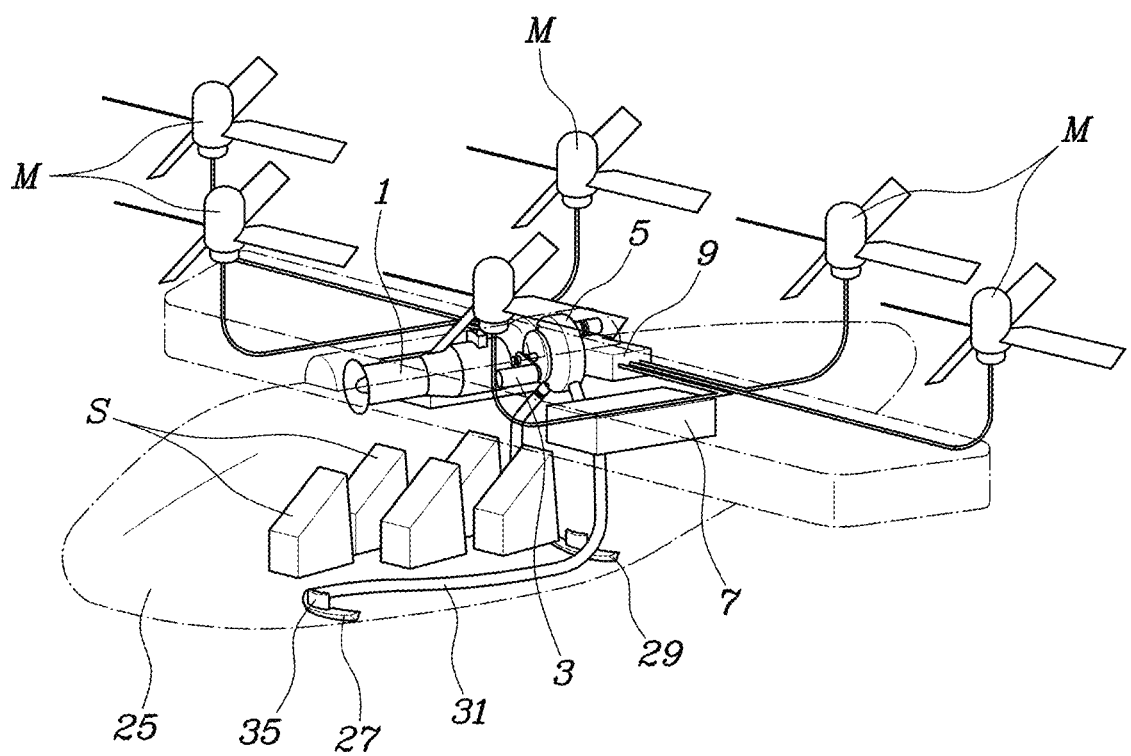
FIG. 1 is a view exemplarily illustrating an air vehicle having an auxiliary propulsion apparatus according to various exemplary embodiments of the present invention.
Figure 2:
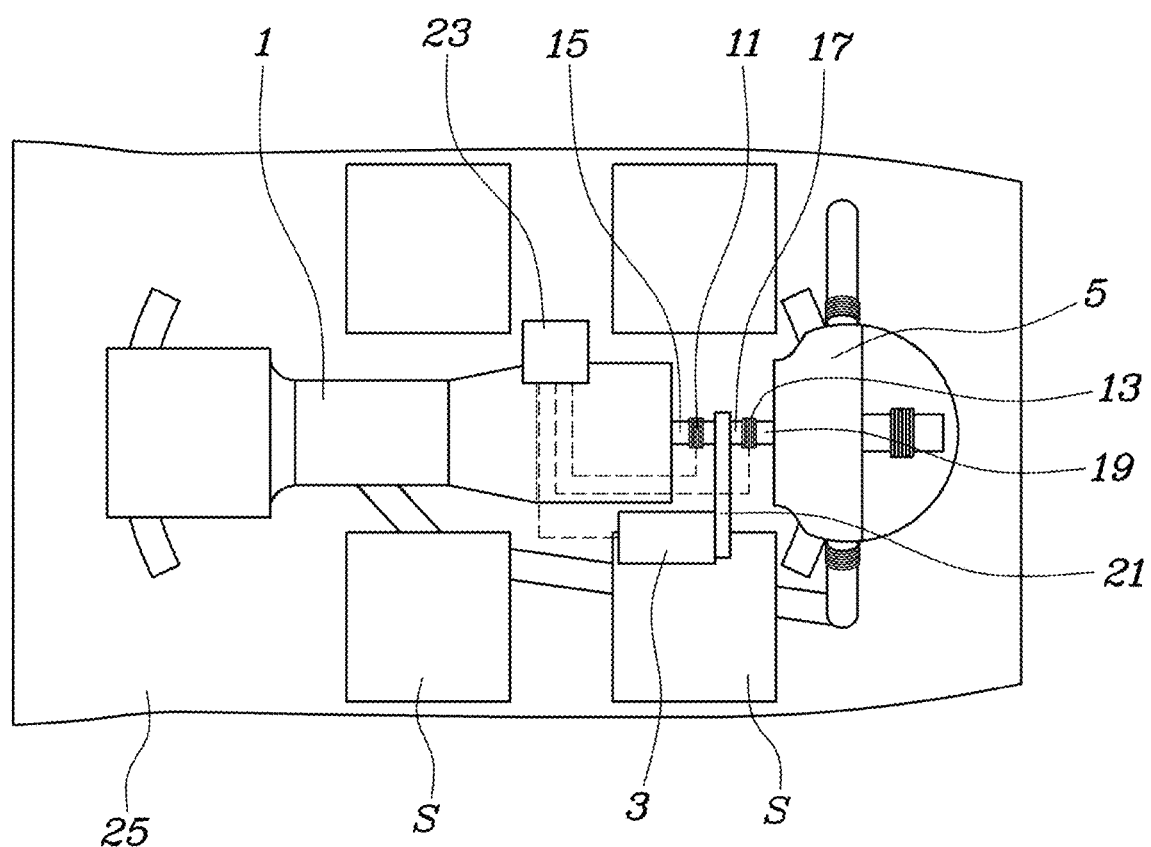
FIG. 2 is a view exemplarily illustrating a structure for connecting an engine, a compressor and a generator when viewed from above in FIG. 1.
Figure 3:
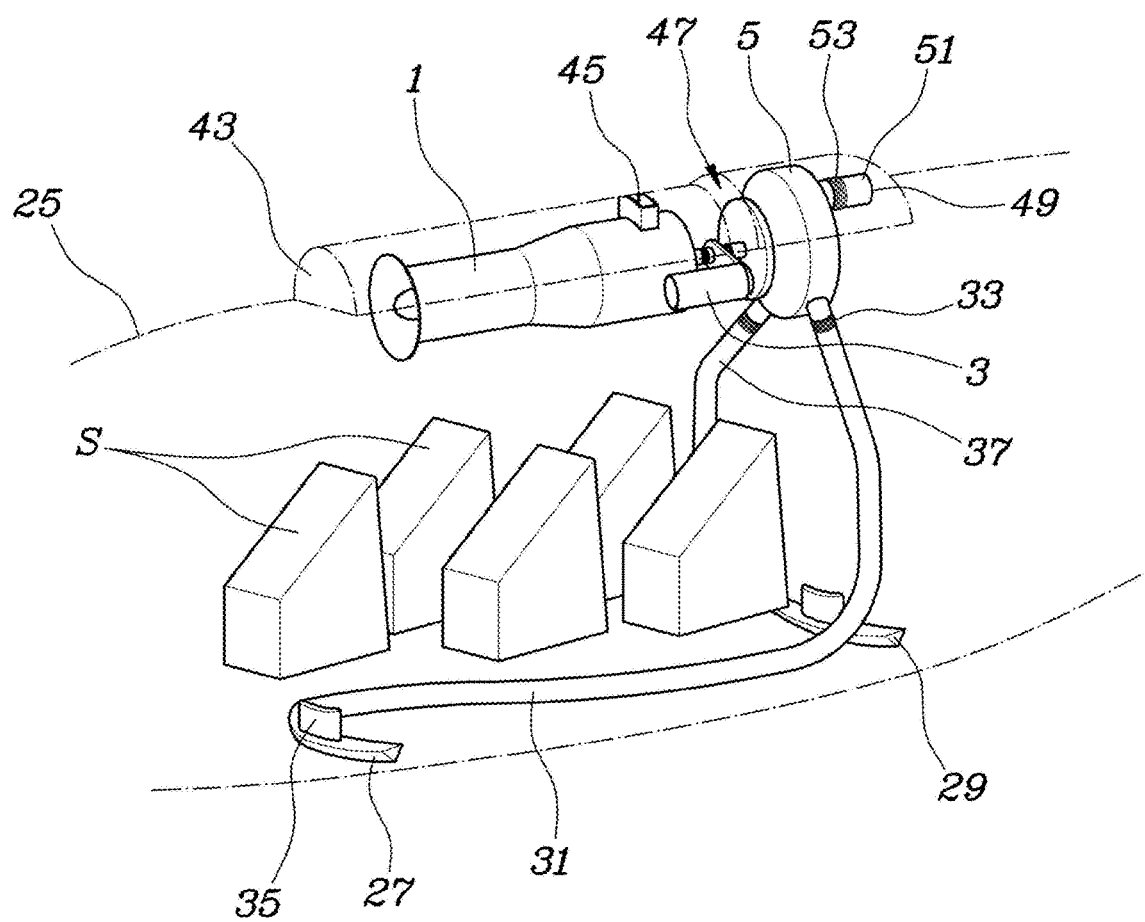
FIG. 3 is a detailed view exemplarily illustrating substantial components of FIG. 1.
Figure 4:
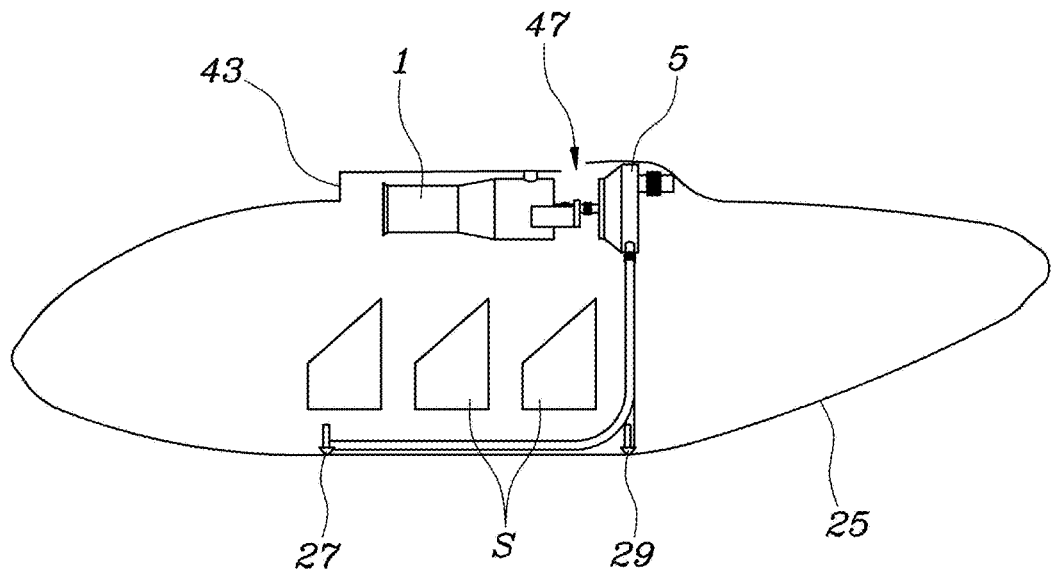
FIG. 4 is a view exemplarily illustrating the structure of the auxiliary propulsion apparatus shown in FIG. 1 when viewed from the lateral side of the air vehicle.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Specific structural and functional descriptions of embodiments of the present invention disclosed herein are only for illustrative purposes of the exemplary embodiments of the present invention. The present invention may be embodied in various forms, without departing from the spirit and significant characteristics of the present invention. Therefore, the exemplary embodiments of the present invention are disclosed only for illustrative purposes, and should not be construed as limiting the present invention.

Reference will now be made in detail to various embodiments of the present invention, specific examples of which are illustrated in the accompanying drawings and described below, since the exemplary embodiments of the present invention may be variously modified in various forms. While the present invention will be described in conjunction with exemplary embodiments thereof, it is to be understood that the present description is not intended to limit the present invention to those exemplary embodiments. On the other hand, the present invention is directed to cover not only the exemplary embodiments of the present invention, but also various alternatives, modifications, equivalents and other embodiments which may be included within the spirit and scope of the present invention as defined by the appended claims.

It will be understood that, although the terms "first," "second," etc. may be used herein to describe various elements, these elements should not be construed as being limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element, or intervening elements may be present therebetween. In contrast, it should be understood that when an element is referred to as being "directly coupled" or "directly connected" to another element, there are no intervening elements present. Other expressions that explain the relationships between elements, such as "between," "directly between," "adjacent to," or "directly adjacent to," should be understood in the same way.

The terminology used herein is for the purpose of describing various exemplary embodiments only, and is not intended to be limiting. As used herein, the singular forms "a," "an" and "the" are intended to include the plural forms as well, unless the context clearly indicates otherwise. It will be further understood that the terms "comprise", "include", "have", etc. When used in the exemplary embodiment specify the presence of stated features, integers, steps, operations, elements, components, or combinations thereof, but do not preclude the presence or addition of one or more other features, integers, steps, operations, elements, components, or combinations thereof.

Unless otherwise defined, all terms including technical and scientific terms used herein have the same meaning as those commonly understood by one of ordinary skill in the art to which the present invention belongs. It will be further understood that terms, such as those defined in commonly used dictionaries, should be interpreted as having meanings consistent with their meanings in the context of the relevant art and the present invention, and are not to be interpreted in an idealized or formal sense overly formal sense unless expressly so defined herein.

Hereinafter, various exemplary embodiments of the present invention will be described in detail with reference to the accompanying drawings. Throughout the drawings, the same reference numerals will refer to the same or like parts.

Referring to FIGS. 1 to 6, an auxiliary propulsion apparatus of an air vehicle according to various exemplary embodiments of the present invention includes an engine 1 mounted in the air vehicle, a generator 3 configured to be driven using the power from the engine 1, a compressor 5 configured to be driven by the engine 1 or the generator 3, a battery 7 configured to store the electricity generated by the generator 3, an electricity distributor 9 configured to distribute the electricity generated by the generator 3 to the battery 7 and to a main propulsion apparatus M, and at least one nozzle device configured to discharge high-pressure gas, supplied from the compressor 5, to the outside of the fuselage of the air vehicle.

In other words, the auxiliary propulsion apparatus according to the exemplary embodiment of the present invention is directed to jet the high-pressure gas, generated by the compressor 5, through the nozzle device to supplement the lifting force and thrust force required for flight of the air vehicle.

Here, the main propulsion apparatus M may include a propeller, which is used in a conventional UAM or the like, a motor configured for driving the propeller and an inverter for driving the motor, as illustrated in FIG. 1.

The electric power supplied to the motor of the main propulsion apparatus M may be supplied from the battery 7, or the electric power generated by the generator 3 which is driven using the power from the engine 1, may be directly supplied to the motor of the main propulsion apparatus M.

The generator 3 may also serve as an electric motor configured for generating the rotative force required to drive the compressor 5.

For reference, reference letter "S" in the drawings denotes seats on which passengers sit, and thus the space in which the seats are disposed may be considered to be the space for passengers in the air vehicle.

To engage and disengage the transmission of power from the engine 1 to the generator 3, a first clutch 11 is provided. Furthermore, to engage and disengage the transmission of power from the engine 1 to the compressor 5 via the first clutch 11, a second clutch 13, which is connected to the first clutch 11 in series, is provided.

Accordingly, when only the first clutch 11 is engaged, the power from the engine 1 is transmitted only to the generator 3 but is not transmitted to the compressor 5. This is the case in which auxiliary thrust force is not necessary.

Meanwhile, when the first clutch 11 is disengaged and only the second clutch 13 is engaged, only the generator 3 and the compressor 5 are configured for transmitting the power. Because the compressor 5 is driven by the generator 3 while the engine 1 is not operated, the rotative force generated by the generator 3 is usable only in driving the compressor 5, without being subjected to the drag from the engine 1 in the event of engine failure.

The output shaft 15 of the engine 1, the first clutch 11 and the second clutch 13 are coaxially disposed, and the power from the generator 3 is transmitted through an intermediate shaft 17 between the first clutch 11 and the second clutch 13.

In other words, when all of the output shaft 15 of the engine 1, the first clutch 11, the second clutch 13 and the input shaft of the compressor 5 are coaxially disposed, the simplest construction configured for minimizing loss of transmission of power when the compressor 5 is driven using the power from the engine 1 is established.

The transmission of power from the intermediate shaft 17 to the generator 3 may be realized by various transmission of power devices 21 such as a belt, a chain, or a circumscribed gear train.

The auxiliary propulsion apparatus according to the exemplary embodiment of the present invention may include a controller 23, which is configured to drive the compressor 5 by driving the generator 3 using the electric power from the battery 7 in the state in which the first clutch 11 is disengaged and only the second clutch 13 is engaged.

When the condition of the engine 1 is determined to be a hindrance rather than a help in driving the compressor 5 by the generator 3, the controller 23 performs control to disengage the first clutch 11 to disconnect the engine 1 from the intermediate shaft 17 and to engage only the second clutch 13 to allow the intermediate shaft 17 to be driven by the generator 3, transmitting the power of the intermediate shaft 17 to the input shaft 19 of the compressor 5.

The controller 23 may be provided as a portion of another controller mounted on the air vehicle or a separate component.

The nozzle device may include a lift-generating nozzle device configured to jet high-pressure gas in the downward direction of the fuselage 25 of the air vehicle and a thrust-generating nozzle device configured to jet the high-pressure gas in a rearward direction of the fuselage.

In other words, in the exemplary embodiment of the present invention, the nozzle device includes both the lift-generating nozzle device configured to generate lift force configured for assisting in vertical takeoff and landing of the air vehicle and the thrust-generating nozzle device configured to assist in creation of thrust force required for cruising of the air vehicle.

The lift-generating nozzle device includes a front nozzle 27 provided at a front lower side of the fuselage and a rear nozzle 29 provided at a rear lower side of the fuselage.

In the fuselage of the air vehicle, which is elongated in an anteroposterior direction as illustrated in the drawings, the front nozzle 27 is provided at the front lower side of the fuselage, and the rear nozzle 29 is provided at the rear lower side of the fuselage. Accordingly, when high-pressure gas is jetted from both the front nozzle 27 and the rear nozzle 29 to generate lift force, the fuselage 25 of the air vehicle is maintained in the horizontal state without being inclined in an anteroposterior direction thereof, and stably receives supplemental lift force required for vertical takeoff and landing of the fuselage 25.

The front nozzle 27 and the rear nozzle 29 may be symmetrically disposed to face each other, and may be each configured to have a linear shape.

Figure 5:
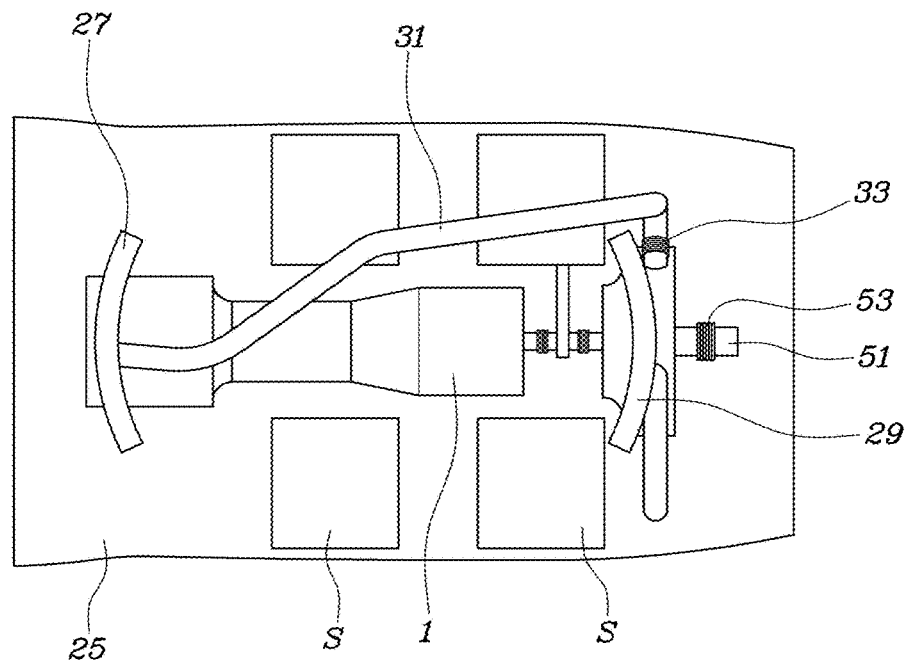
FIG. 5 is a view exemplarily illustrating the structure of the auxiliary propulsion apparatus shown in FIG. 1 when viewed from the underside of the air vehicle.
Figure 6:
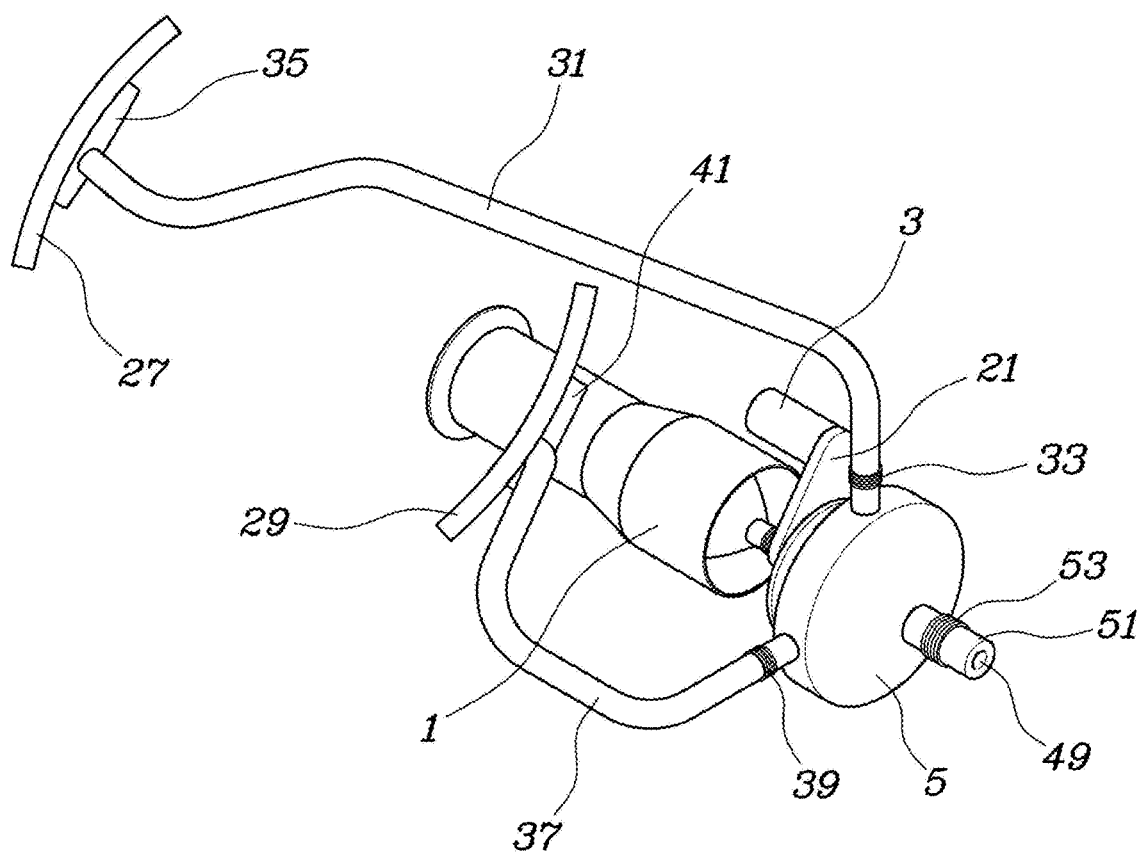
FIG. 6 is a view exemplarily illustrating the auxiliary propulsion apparatus shown in FIG. 5 when viewed from another direction thereof.

The term "linear" as used herein means to include a straight line, an arch and the like. Referring to FIG. 5, the front nozzle 27 and the rear nozzle 29 are symmetrically disposed to face each other, and may be each configured to have an arch shape.

When the front nozzle 27 and the rear nozzle 29 are symmetrically disposed to face each other and are each configured to have a linear shape, as in the exemplary embodiment of the present invention, there are advantages in that the air vehicle is maintained in a stable posture and is subjected to lift force required for vertical takeoff and landing by the high-pressure gas jetted from both the front nozzle 27 and the rear nozzle 29.

The front nozzle 27 is connected to the compressor 5 via a front gas pipe 31, and the front gas pipe 31 is disposed with a front gas valve 33 configured to control the flow rate of high-pressure gas jetted from the front nozzle 27. A front tank 35 for temporarily storing the high-pressure gas therein is provided between the front nozzle 27 and the front gas pipe 31 to uniformly jet the high-pressure gas from the linear front nozzle 27.

In an exemplary embodiment of the present invention, the time for the front tank 35 for temporarily storing the high-pressure gas therein is determined according to the volume of the front tank 35 and flow rate of the high-pressure gas jetted from the front nozzle 27.

Accordingly, it is possible to control the flow rate of high-pressure gas jetted from the front nozzle 27 and thus to control the lift force acting on the air vehicle by manipulating the front gas valve 33 while the compressor 5 generates the high-pressure gas. Here, the front tank 35 is configured as a buffer for uniformly distributing the high-pressure gas, transmitted from the compressor 5 through the front gas pipe 31, to the linear front nozzle 27.

The rear nozzle 29 is connected to the compressor 5 via a rear gas pipe 37, and the rear gas pipe 37 is provided with a rear gas valve 39 configured to control the flow rate of high-pressure gas jetted from the rear nozzle 29. A rear tank 41 for temporarily storing the high-pressure gas therein is provided between the rear nozzle 29 and the rear gas pipe 37 to uniformly jet the high-pressure gas from the linear rear nozzle 29.

In an exemplary embodiment of the present invention, the time for the rear tank 41 for temporarily storing the high-pressure gas therein is determined according to the volume of the rear tank 41 and flow rate of the high-pressure gas jetted from the rear nozzle 29.

Accordingly, it is possible to control the flow rate of high-pressure gas jetted from the rear nozzle 29 and thus to control the lift force acting on the air vehicle by manipulating the rear gas valve 39 while the compressor 5 generates the high-pressure gas. Here, the rear tank 41 is configured as a buffer for uniformly distributing the high-pressure gas, transmitted from the compressor 5 through the rear gas pipe 37, to the linear rear nozzle 29.

Here, each of the front gas pipe 31 and the rear gas pipe 37 is configured to be relatively freely curved, as illustrated in the drawings, and to be configured for transmitting high-pressure gas, making it easy to ensure space for passengers in the air vehicle.

In an exemplary embodiment of the present invention, the front gas valve 33 and the rear gas valve 39 may include an actuator electrically connected to the controller 23 so that the controller 23 may control the operations of the front gas valve 33 and the rear gas valve 39.

The engine 1 and the compressor 5 are disposed at a center upper side of the fuselage 25, as illustrated in the drawings. An engine intake duct 43, through which air is supplied to the engine 1, is provided at an upper side of the fuselage 25, and an engine exhaust duct 45, through which the air from the engine 1 is discharged, is provided at an upper side of the fuselage 25 to protrude slightly upwards. Consequently, introduction of air to the engine 1 and discharge of air from the engine 1 are efficiently realized by a simple structure, and interference with space for passengers is avoided.

A compressor intake duct 47 is separately provided behind the engine 1 to efficiently supply air to be compressed in the compressor 5.

Meanwhile, the thrust-generating nozzle device includes a thrust nozzle 49 configured to jet high-pressure gas in the rearward direction of the fuselage 25 to generate cruising force, a thrust gas pipe 51 connecting the thrust nozzle 49 to the compressor 5, and a thrust gas valve 53 provided at the thrust gas pipe 51.

Accordingly, it is possible to control the flow rate of high-pressure gas jetted through the thrust nozzle 49 to thus control creation of thrust force assisting in cruising of the air vehicle by manipulating the thrust gas valve 53 while the compressor 5 is driven.

Figure 7:
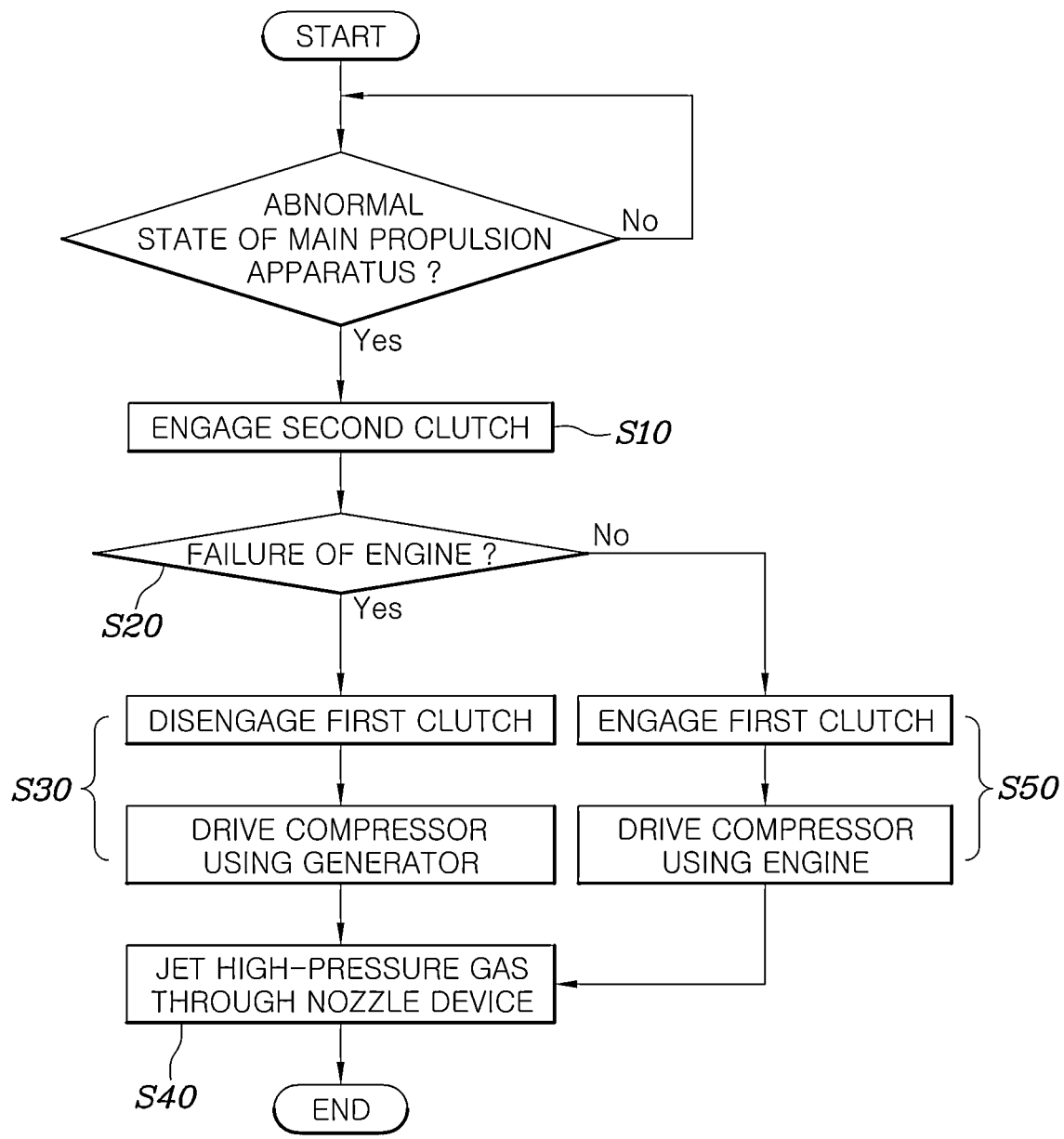
FIG. 7, FIG. 8, FIG. 9 and FIG. 10 are flowcharts illustrating a method of controlling the auxiliary propulsion apparatus according to various exemplary embodiments of the present invention.

As illustrated in FIG. 7, a method of controlling the auxiliary propulsion apparatus of an air vehicle according to various exemplary embodiments of the present invention may include engaging the second clutch 13 when an abnormal state occurs in the main propulsion apparatus M (S10), determining whether or not the engine 1 has failed (S20), disengaging the first clutch 11 and driving the generator 3 using the electric power from the battery 7 to drive the compressor 5 when the engine 1 has failed (S30), and jetting the high-pressure gas, supplied from the compressor 5, through the nozzle device to assist in creation of the thrust force for the air vehicle (S40).

When the condition of the engine 1 is determined to be normal as a result of the determination of failure of the engine 1, the method may include engaging the first clutch 11 and driving the compressor 5 using the power from the engine 1 (S50).

When there is a need to provide auxiliary thrust force by the auxiliary propulsion apparatus, the second clutch 13 is disengaged to be ready to drive the compressor 5. Subsequently, depending on whether or not the engine 1 has failed, the first clutch 11 is engaged to drive the compressor 5 using the power from the engine 1, or the first clutch 11 is disengaged to drive the compressor 5 using the power from the generator 3, facilitating the compressor 5 to generate high-pressure gas to be jetted through the nozzle device.

Figure 8:
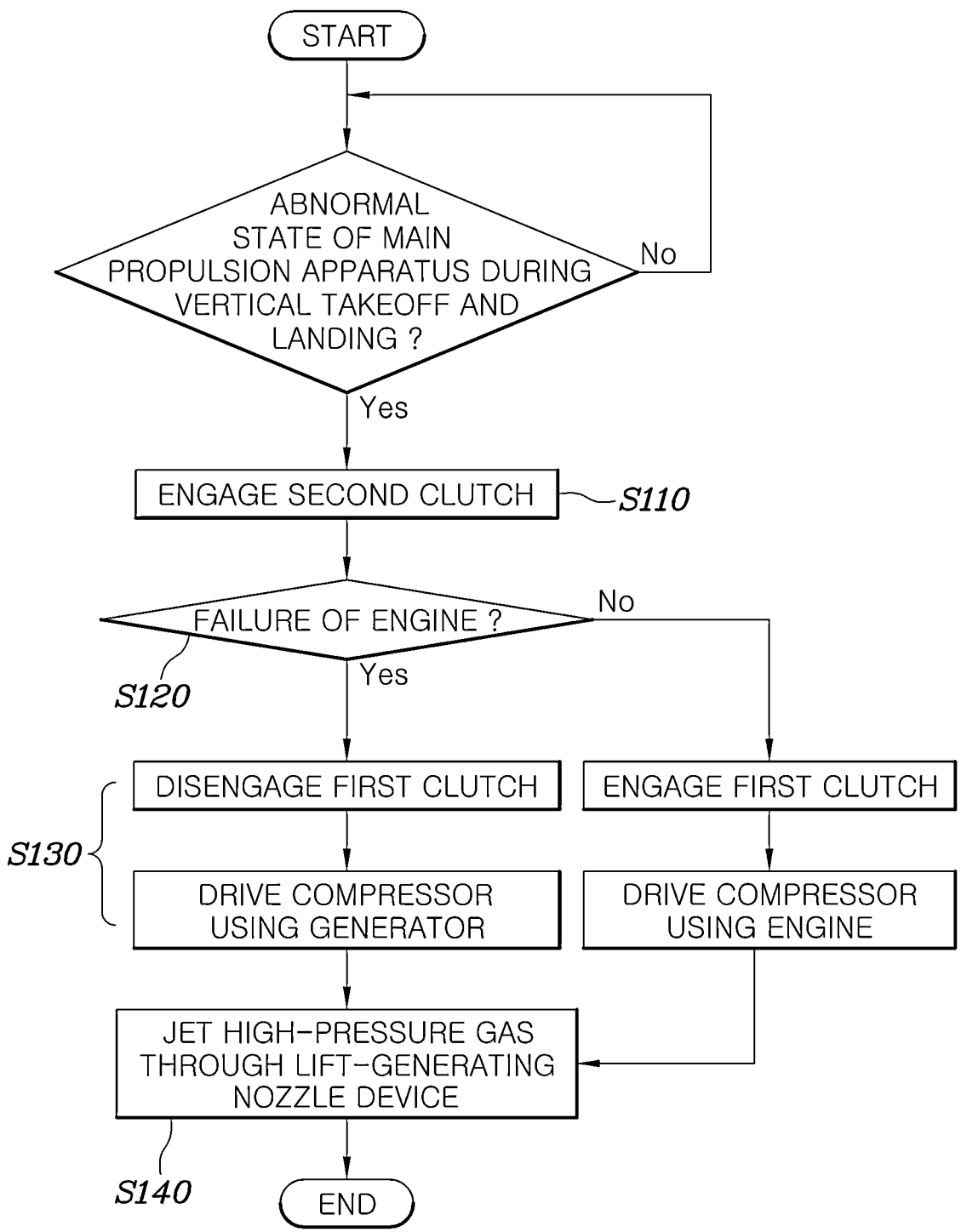

In vertical takeoff and landing of the air vehicle, as illustrated in FIG. 8, the method of controlling the auxiliary propulsion apparatus of an air vehicle according to various exemplary embodiments of the present invention may include engaging the second clutch 13 when an abnormal state occurs in the main propulsion apparatus M (S110), determining whether or not the engine 1 has failed (S120), disengaging the first clutch 11 and driving the generator 3 using the electric power from the battery 7 to drive the compressor 5 when the engine 1 has failed (S130), and jetting the high-pressure gas, supplied from the compressor 5, through the lift-generating nozzle device to assist in takeoff and landing of the air vehicle (S140).

Figure 9:
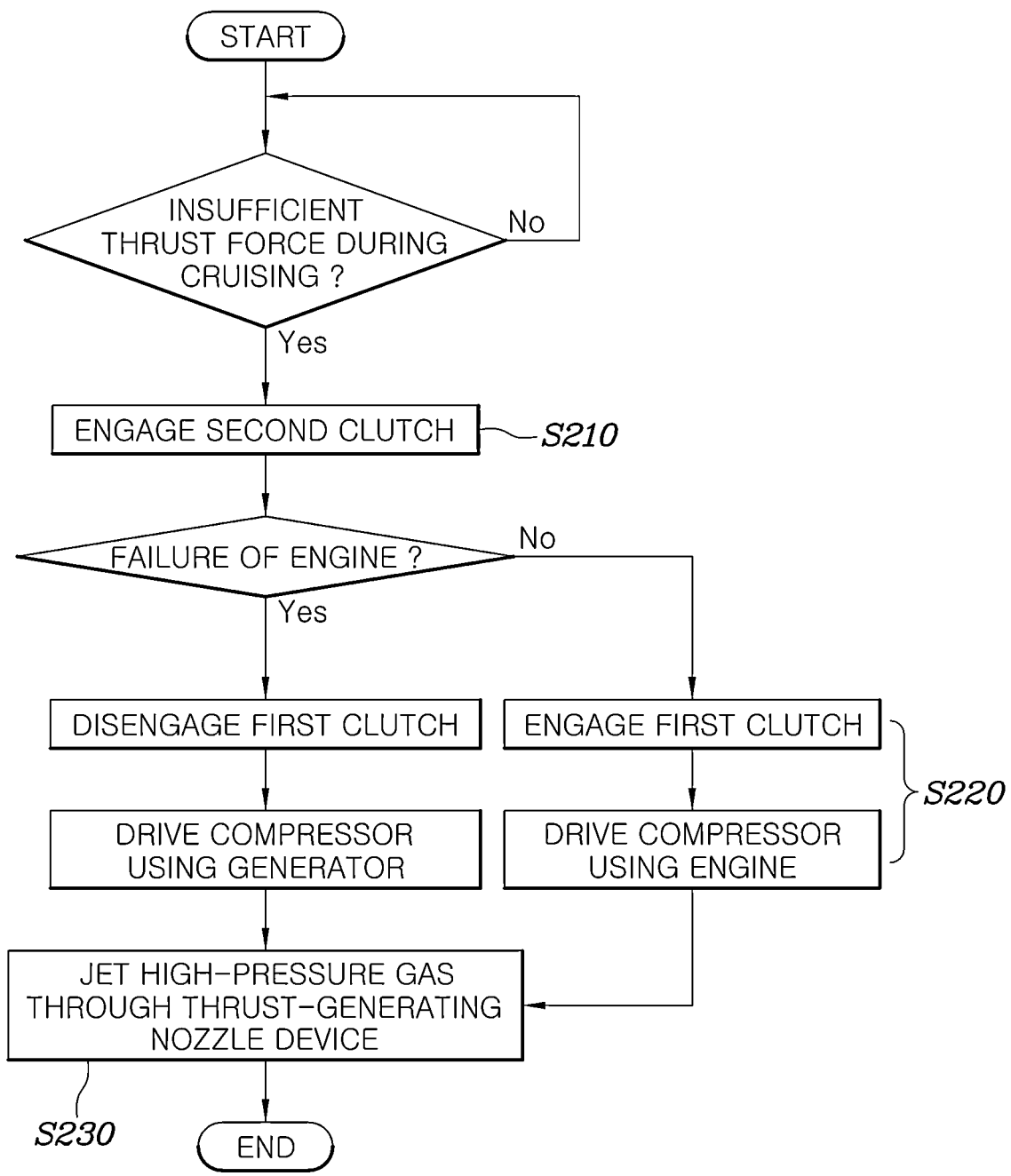

When there is insufficient thrust force for cruising of the air vehicle, as illustrated in FIG. 9, the method of controlling the auxiliary propulsion apparatus of an air vehicle according to various exemplary embodiments of the present invention may include engaging the second clutch 13 (S210), engaging the first clutch 11 and driving the compressor 5 using the power from the engine 1 when the engine 1 has not failed (S220), and jetting the high-pressure gas, supplied from the compressor 5, through the thrust-generating nozzle device to supplement the thrust force required for the air vehicle (S230).

Figure 10:
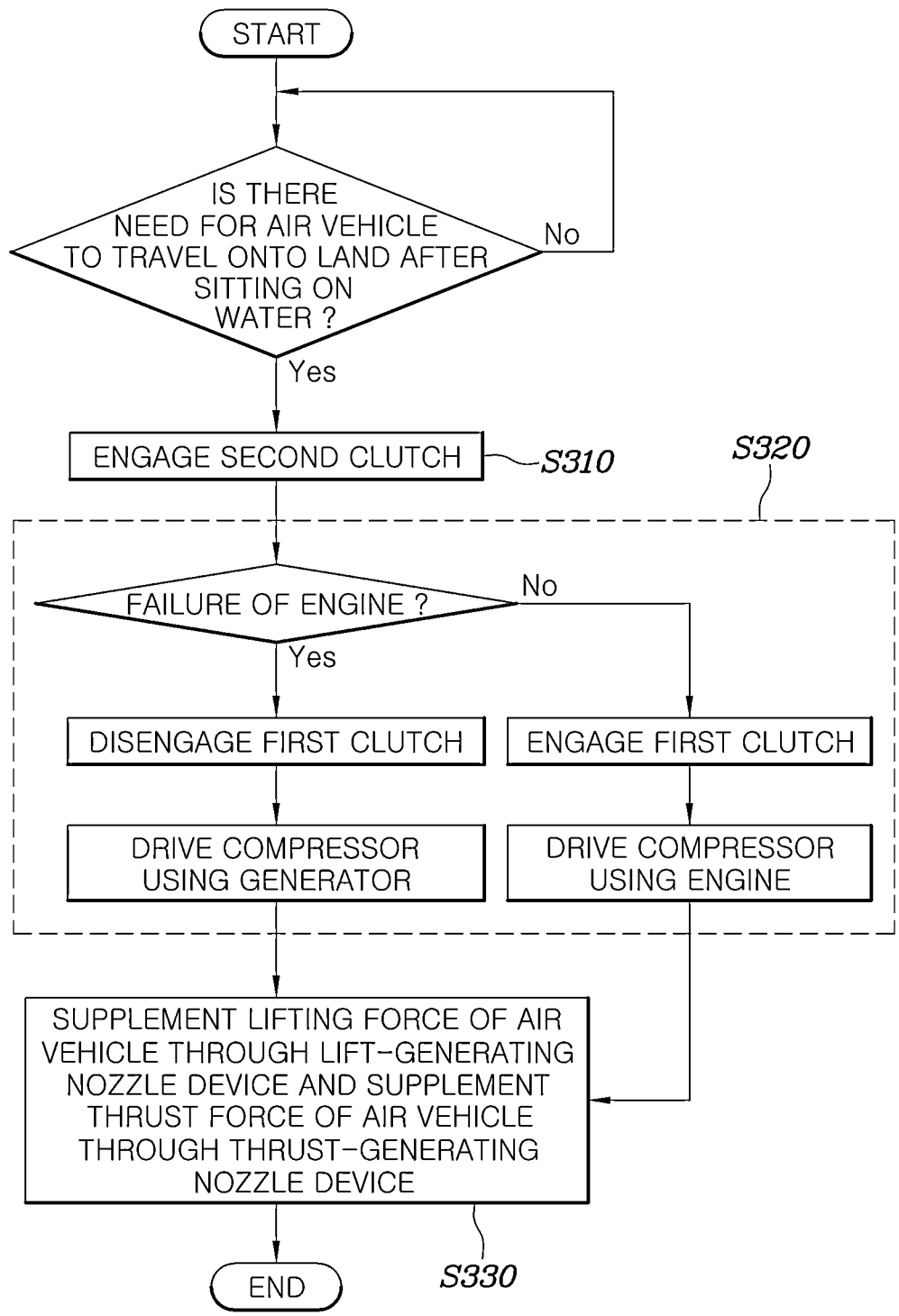

When there is a demand for the air vehicle to travel to onto land after sitting on the water, as illustrated in FIG. 10, the method of controlling the auxiliary propulsion apparatus of an air vehicle according to various exemplary embodiments of the present invention may include engaging the second clutch 13 (S310), engaging the first clutch 11 and driving the compressor 5 using the power from the engine 1 in the case in which the engine 1 has not failed or disengaging the first clutch 11 and driving the generator 3 using the electric power from the battery 7 to drive the compressor 5 in the case in which the engine 1 has failed (S320), and jetting the high-pressure gas, supplied from the compressor 5, through the lift-generating nozzle device to supplement the lifting force of the air vehicle and jetting the high-pressure gas, supplied from the compressor 5, through the thrust-generating nozzle device to supplement the thrust force required for traveling of the air vehicle on the water (S330).

As is apparent from the above description, the present invention is configured to efficiently and flexibly provide lift force and auxiliary thrust force required for cruising of an air vehicle to improve stability and flight performance of the air vehicle while ensuring increased drag, minimized reduction of a space for passengers and increased range.

Furthermore, when there is a demand for the air vehicle to travel onto land after sitting on the water, the present invention is configured to supplement the buoyancy and thrust force required for traveling on water and thus to return the air vehicle to land without additional collection work.

In an exemplary embodiment of the present invention, the operations of FIGS. 7, 8, 9 and 10 is performed by the controller 23.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling an auxiliary propulsion apparatus of an air vehicle, the method comprising: providing the auxiliary propulsion apparatus including an engine mounted in a fuselage of the air vehicle; a generator engaged to the engine and configured to be driven using power from the engine; a compressor engaged to the engine and the generator and configured to be driven by the engine or the generator; a battery electrically connected to the generator and configured to store electricity generated by the generator; an electricity distributor connected to the generator, the battery and a main propulsion apparatus and configured to distribute electricity generated by the generator to the battery and the main propulsion apparatus; at least a nozzle apparatus connected to the compressor and configured to jet pressurized gas supplied from the compressor, to an outside of the fuselage; a first clutch mounted between the engine and the generator and configured to selectively engage transmission of power from the engine to the generator; and a second clutch connected to the first clutch in series to selectively engage transmission of the power from the engine to the compressor via the first clutch, engaging, by a controller electrically connected to the second clutch, the second clutch when an abnormal state occurs in the main propulsion apparatus;

determining, by the controller, whether the engine has failed;

disengaging, by the controller electrically connected to the first clutch and the generator, the first clutch and driving the generator using power from the battery to drive the compressor, upon determining that the engine has failed; and controlling, by the controller electrically connected to the nozzle apparatus, the nozzle apparatus to jet the pressurized gas supplied from the compressor, through the nozzle apparatus to supplement a thrust force of the air vehicle.

2. The method of claim 1, further including:
engaging, by the controller, the first clutch to drive the compressor using power from the engine when the engine is determined to be normal as a result of determining as to whether the engine has failed.

3. A method of controlling an auxiliary propulsion apparatus of an air vehicle, the method comprising: providing the auxiliary propulsion apparatus including an engine mounted in a fuselage of the air vehicle; a generator engaged to the engine and configured to be driven using power from the engine; a compressor engaged to the engine and the generator and configured to be driven by the engine or the generator; a battery electrically connected to the generator and configured to store electricity generated by the generator; an electricity distributor connected to the generator, the battery and a main propulsion apparatus and configured to distribute electricity generated by the generator to the battery and the main propulsion apparatus; at least a nozzle apparatus connected to the compressor and configured to jet pressurized gas supplied from the compressor, to an outside of the fuselage; a first clutch mounted between the engine and the generator and configured to selectively engage transmission of power from the engine to the generator; and a second clutch connected to the first clutch in series to selectively engage transmission of the power from the engine to the compressor via the first clutch, wherein the nozzle apparatus includes a lift-generating nozzle apparatus configured to jet the pressurized gas in a downward direction of the fuselage of the air vehicle; and a thrust-generating nozzle apparatus configured to jet the pressurized gas in a rearward direction of the fuselage of the air vehicle,
  engaging, by the controller electrically connected to the second clutch, the second clutch when an abnormal state occurs in the main propulsion apparatus during vertical takeoff and landing of the air vehicle;
  determining, by the controller, whether the engine has failed;
  disengaging, by the controller electrically connected to the first clutch and the generator, the first clutch and driving the generator using power from the battery to drive the compressor, upon determining that the engine has failed; and
  controlling, by the controller electrically connected to the lift-generating nozzle apparatus, the lift-generating nozzle apparatus to jet the pressurized gas supplied from the compressor, through the lift-generating nozzle apparatus to assist takeoff and landing of the air vehicle.

4. The method of claim 3, further including:
engaging, by the controller, the second clutch when a thrust force is in for cruising of the air vehicle;
engaging, by the controller, the first clutch to drive the compressor using power from the engine upon determining that the engine has not failed; and
controlling, by the controller electrically connected to the thrust-generating nozzle apparatus, the thrust-generating nozzle apparatus to jet the pressurized gas supplied from the compressor, through the thrust-generating nozzle apparatus to supplement the thrust force of the air vehicle.

5. The method of claim 3, further including:
engaging, by the controller, the second clutch upon determining that there is a demand for the air vehicle to travel onto a land after sitting on a water;
engaging, by the controller, the first clutch to drive the compressor using power from the engine upon determining that the engine has not failed or disengaging the first clutch to drive the generator using electric power received from the battery upon determining that the engine has failed; and
controlling, by the controller electrically connected to the lift-generating nozzle apparatus, the lift-generating nozzle apparatus to jet the pressurized gas supplied from the compressor, through the lift-generating nozzle apparatus to supplement lifting force of the air vehicle and controlling, by the controller electrically connected to the thrust-generating nozzle apparatus, the thrust-generating nozzle apparatus to jet the pressurized gas supplied from the compressor, through the thrust-generating nozzle apparatus to supplement thrust force for traveling of the air vehicle on water.

* * * * *